United States Patent
Sinai et al.

(10) Patent No.: US 12,551,370 B2
(45) Date of Patent: Feb. 17, 2026

(54) OCULAR PLATFORMS AND SURGICAL TOOLS

(71) Applicant: RETBUL MEDICAL LTD, Alon Hagalil (IL)

(72) Inventors: Nir Sinai, Alon Hagalil (IL); Doron Smulian, Haifa (IL); Michael Belkin, Givat Shmuel (IL); Yishay Falick, Jerusalem (IL)

(73) Assignee: RETBUL MEDICAL LTD, Alon Hagalil (IL)

( * ) Notice: Subject to any disclaimer, the term of this patent is extended or adjusted under 35 U.S.C. 154(b) by 200 days.

(21) Appl. No.: 18/272,680

(22) PCT Filed: Jan. 18, 2022

(86) PCT No.: PCT/IB2022/050378
§ 371 (c)(1),
(2) Date: Jul. 17, 2023

(87) PCT Pub. No.: WO2022/162499
PCT Pub. Date: Aug. 4, 2022

(65) Prior Publication Data
US 2024/0299214 A1    Sep. 12, 2024

Related U.S. Application Data

(60) Provisional application No. 63/141,536, filed on Jan. 26, 2021.

(51) Int. Cl.
*A61F 9/00* (2006.01)
*A61F 9/007* (2006.01)

(52) U.S. Cl.
CPC ............ *A61F 9/0017* (2013.01); *A61F 9/007* (2013.01)

(58) Field of Classification Search
CPC ... A61B 5/6821; A61B 17/0231; A61F 9/007; A61F 9/00736; A61F 9/009; A61F 2009/0052; A61M 5/427; A61M 2210/0612
See application file for complete search history.

(56) References Cited

U.S. PATENT DOCUMENTS

| | | | |
|---|---|---|---|
| 3,074,407 A | 1/1963 | Moon et al. | |
| 4,665,913 A * | 5/1987 | L'Esperance, Jr. | ..... A61F 9/009 219/121.61 |
| 5,213,114 A | 5/1993 | Bailey | |

(Continued)

FOREIGN PATENT DOCUMENTS

| | | |
|---|---|---|
| DE | 10 2017 005 874 | 12/2018 |
| RU | 2 244 532 | 1/2005 |
| WO | 2019/202603 | 10/2019 |

*Primary Examiner* — Kami A Bosworth
(74) *Attorney, Agent, or Firm* — The Law Office of Joseph L. Felber

(57) ABSTRACT

A platform for introducing various treatment tools through a conduit in order to treat various ocular pathologies by attaching it to a human eyeball. The platform has an axis that defines opposing anterior and posterior axial directions. The platform includes a framework formed about the axis and the framework has anterior and posterior openings at respective anterior and posterior sides. The platform includes also a hollow conduit that extends through the framework while passing through the anterior and posterior openings.

20 Claims, 16 Drawing Sheets

(56) References Cited

U.S. PATENT DOCUMENTS

| | | |
|---|---|---|
| 5,616,139 A | 4/1997 | Okamoto |
| 5,817,075 A | 10/1998 | Giungo |
| 6,267,752 B1 | 7/2001 | Svetliza |
| 2003/0060763 A1* | 3/2003 | Penfold ................ A61F 9/0017 604/116 |
| 2010/0004499 A1 | 1/2010 | Brigatti et al. |
| 2013/0144260 A1* | 6/2013 | Dewoolfson ........... A61M 5/32 604/116 |
| 2017/0360605 A1 | 12/2017 | Oberkircher et al. |
| 2017/0360606 A1 | 12/2017 | Price et al. |
| 2018/0263815 A1 | 9/2018 | Clem et al. |
| 2018/0289958 A1* | 10/2018 | Lebreton ............... A61F 9/0008 |
| 2019/0076295 A1 | 3/2019 | Bashir |
| 2019/0117453 A1 | 4/2019 | Rathjen |
| 2020/0163737 A1* | 5/2020 | Singh .................... A61B 90/30 |
| 2023/0346598 A1* | 11/2023 | Horvath ................ A61F 9/0017 |

\* cited by examiner

OCULAR PLATFORMS AND SURGICAL TOOLS

TECHNICAL FIELD

Embodiments of the invention relate to ocular platforms and surgical tools, and for example to guidance of such surgical tools, such as retrobulbar surgical tools, via the platforms to their targeted locations on the eye.

BACKGROUND

The human eye has several layers, including the sclera which comprises a white outer layer of the eye. The sclera provides support and protection to the choroid layer and to the retina which comprises the innermost layer. The choroid layer includes vasculature that provides oxygen and nourishment to the retina. The retina has a light sensitive tissue that includes light sensitive cells responsible for creating the visual information and transmitting it to the brain via axons of the retinal ganglion cells which forms the optic nerve. The macula which is the area of the retina responsible for visual acuity is located at the center of the retina at the anterior aspect of the posterior pole of the eye and is centered on an optic axis passing through the centers of the lens and cornea of the eye.

Various ocular diseases that involve the retina may lead to visual impairment, some of them i.e. macular degeneration or genetic retinal diseases effect the retina directly and some of them occur due to pathologic changes in nearby tissues such as the sclera as is the case in pathologic myopia. In this common pathology the sclera weakens forming an abnormal protrusion of the posterior eyeball wall to form a staphyloma. This lengthening cause thinning of the choroid and retina and may lead to several pathologies in these tissues Treating diseases and/or degenerations in the posterior portion of the eye either within the eye or involving the outer wall of the eye may be challenging. A retrobulbar approach which is the term used to describe a method to reach the eye from behind in order to treat those diseases is especially challenging as the eye is strictly positioned within the orbit bones. Nevertheless retrobulbar approach may add a more physiologic and more precise modality SUMMARY The following embodiments and aspects thereof are described and illustrated in conjunction with systems, tools and methods which are meant to be exemplary and illustrative, not limiting in scope.

In an embodiment a device and/or method for treating scleral staphyloma reinforcement (cross linking) to prevent and reduce the staphyloma is provided. In another embodiment, a device and/or method may be provided for injecting medical materials such as drugs, devices, radioactive components, stem cells or gene carriers into precise locations in the posterior parts of the eye and to the optic nerve and adjacent structures.

Embodiments of devices and/or methods described herein provide advantages of performing procedures, such as administration of injections (or the like), to posterior regions of the eye, which can be performed through the sclera—with a reduced likelihood of causing potential complications to ocular structures, such as retinal detachment. Such procedures, which otherwise are performed through the anterior portion of the eye, when performing e.g. administration of injections may spread the injected material through the vitreous thus affecting not only the desired tissue but other intra and extra ocular tissues as well. Furthermore—optic nerve sheath fenestration and/or injections near or even directly into the optic nerve in accordance with the presented embodiments, may spare open surgical approach of the orbit.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
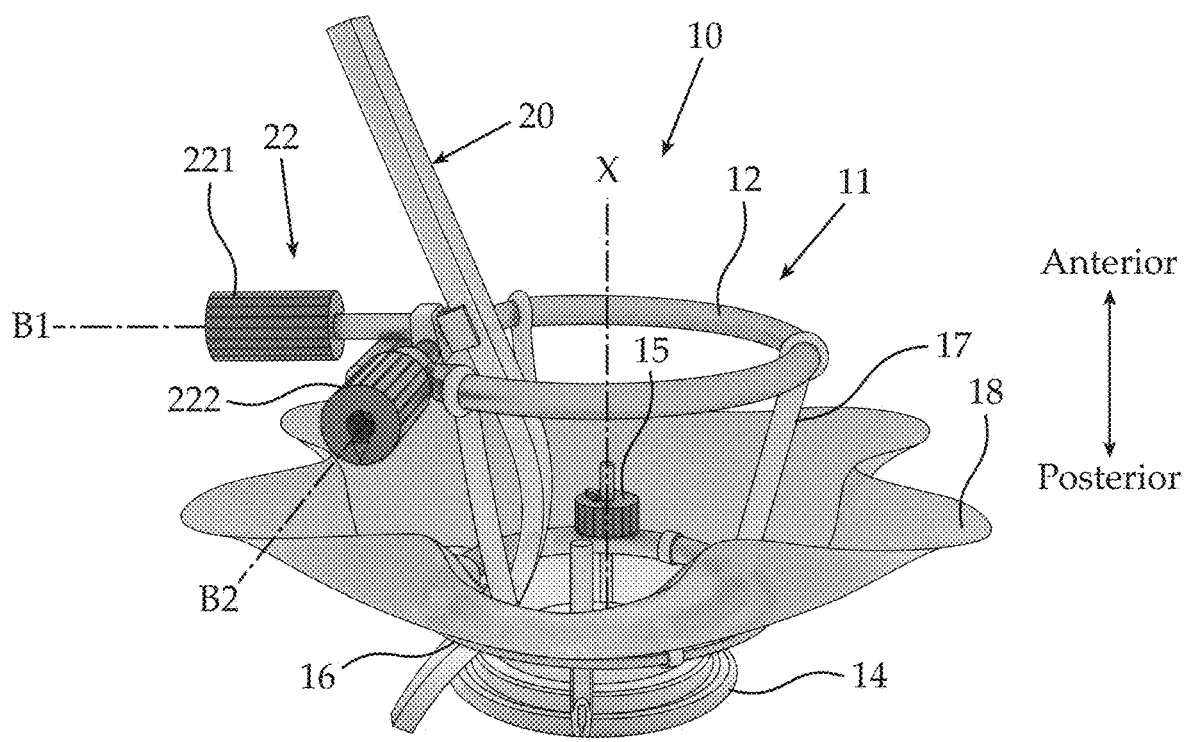
FIGS. 1 and 2 schematically show an eyeball platform in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
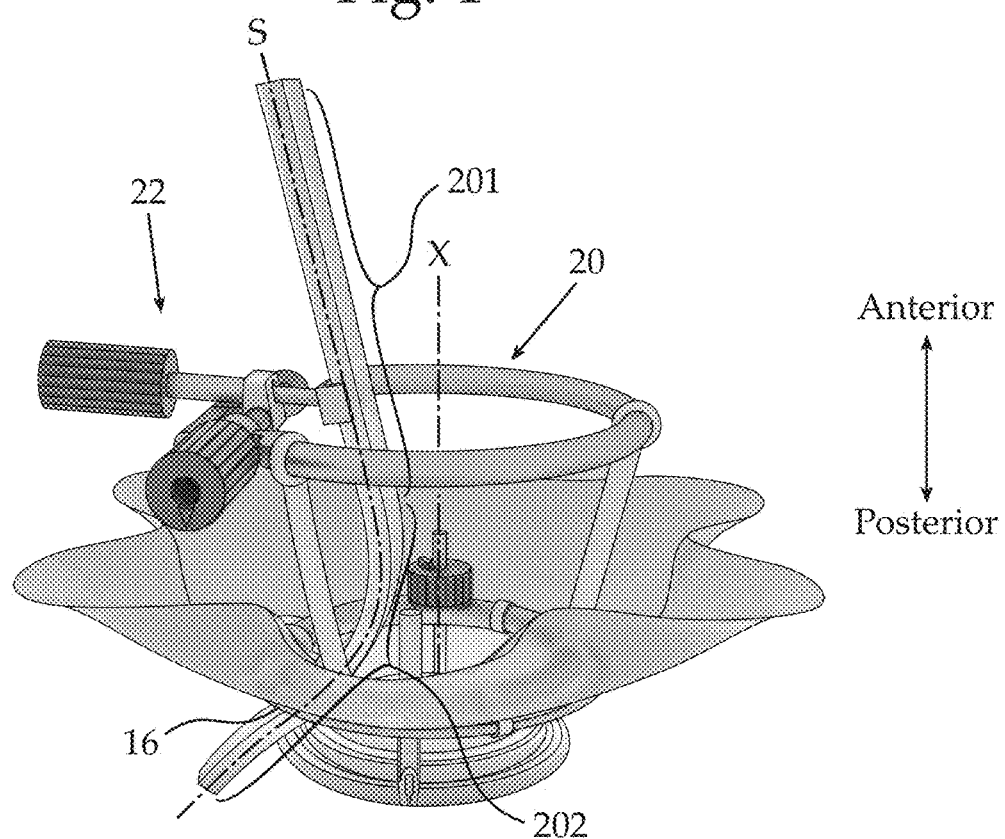

Attention is first drawn to FIGS. 1 and 2 that schematically show an eyeball platform 10 in accordance with an embodiment of the present invention. Platform 10 in this example is shown having a framework 11 generally formed about a central axis X that defines opposing anterior and posterior axial directions.

Framework 11 may substantially enclose a space surrounding axis X or may lie on, or form a skeletal structure substantially included in, an imaginary surface that encloses a space surrounding axis X. In the views provided herein the latter is shown.

Surfaces defined by framework 11 may be suited to form a substantial unobstructed line of sight along axis X and thus along a visual axis of an eye being examined/observed/ treated by a physician through platform 10. Such surfaces may take form of various shapes, such as cylindrical, funnel, coned (and the like).

In the shown examples, framework 11 is embodied as a generally funnel or coned shaped formation that is formed about axis X and converges/tapers in the posterior direction. In the shown example, such funnel or coned formation may optionally be embodied by a series of axially spaced apart ring-like members that diminish in diameter in the posterior direction, and are generally parallel one to the other. In certain cases, respective angles between such ring-like members can be adjusted in relation to an imaginary plane perpendicular to axis X and/or about axis X.

In the optional embodiment that is shown, the coned formation includes a series of three ring-like members, namely a base ring member 12 at an anterior side of the framework or platform, a terminal ring member 14 at a posterior side of the framework or platform, and an intermediate ring member 16 that in this example is located more proximal to the terminal ring member 14. The ring members are kept spaced apart in this example by shaft like spacers 17.

A relative axial spacing between the intermediate and terminal ring members 14, 16 may be adjusted by means of a toggle 15, and a possible anchoring sheath 18 may be located about the intermediate ring member 16, while being attached to the intermediate ring member.

Platform 10 in addition includes an introducing channel or conduit 20 (from hereon referred to as "conduit") and an adjustment mechanism 22 that is fitted adjacent to the base ring member 12 and is adapted to adjust an orientation of the conduit 20 within the framework 11. In the shown example, the adjustment mechanism 22 includes first and second biasing members 221, 222 that are arranged to bias and/or adjust the orientation of conduit 20 along two generally perpendicular first and second axes B1, B2 relative to framework 11.

The first biasing member 221 may be adapted to move conduit 20 in a generally radial direction along axis B1 relative to the base ring member and by that possibly urge tilting of the conduit generally along axis B1. The second biasing member 222 may be adapted to move conduit 20 in a generally tangential direction relative to the base ring member along axis B2 and by that possibly urge tilting of the conduit generally along axis B2.

FIG. 2 illustrates the conduit 20 being slightly tilted by the first biasing member 221 relative to the orientation of the conduit 20 as seen in FIG. 1.

With attention drawn to FIG. 2, conduit 20 can be seen extending along an S curve that may be designed to have varying curvatures in a non-deformed state. Conduit 20 may include a first section 201 that may be generally straight, which transitions in a posterior direction into a second section 202 that may be designed to have an increased curvature that extends away from axis X. A rate of change of the curvature of the second section may initially increase as it extends away from the first section in the posterior direction and may then gradually decrease before possibly curving in an opposing direction (not shown in FIG. 2).

In certain embodiments the adjustment mechanism 22 may be adapted to bear against the conduit 20 at a location along the conduit's first section 201 in order to alter the conduit's orientation relative to the coned formation of the framework 11. The first section 201 of the conduit may be oriented generally transverse to the platform's axis X possibly slanting in a general posterior direction towards axis X until transitioning into second section 202 that slants in a general opposite direction away from axis X as the second section 202 of the conduit advances in the posterior direction.

Attention is drawn to FIGS. 23A, 23B, 24A and 24B to provide views of an embodiment of a platform 100, generally similar to platform 10. The views provided with respect to platform 100 reveal the manner in which the conduit 20 may be anchored/hinged at its lower side to framework 11.

In this embodiment, the platform is seen being provided with a hinge arrangement 24 that is arranged to secure a lower/posterior region of the conduit 20 at a pivot 241 that remains substantially fixed in place relative to the framework of the platform.

Figure 4:
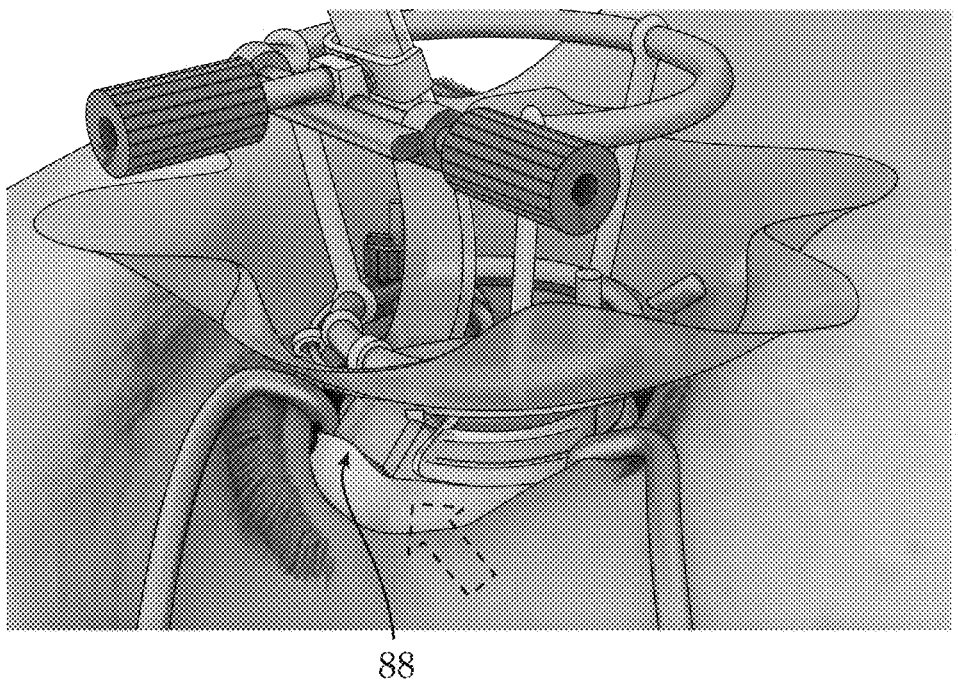

When anchored to an eyeball, the platform's pivot 241 may be arranged to be situated generally at the location of an incision formed in the Tenon capsule through which the conduit enters the subtenon space underneath the Tenon capsule (see incision 88 indicated in FIG. 4). Situating the pivot 241 in that position reduces the likelihood of pulling out from the subtenon space or from causing further damage to the Tenon capsule as the conduit 20 is tilted.

The hinge arrangement 24 in this example includes an arm 242 that is fixed at its upper/anterior end to intermediate ring member 16 and includes pivot 241 at its lower/posterior end. In an embodiment, pivot 241 may take form of a "spherical bearing" that permits angular rotation about a central point in two orthogonal directions. Also seen in FIG. 24 is the provision of an opening 33 within terminal ring member 14 through which the conduit 20 is arranged to pass.

In the figures that are provided the toggles 15, 221, 222 are shown possibly being arranged for manual manipulation by a physician, however in other embodiments (not shown) the toggles may be manipulated by a controller. Such control may be implemented as an open loop control system or as a closed loop control system as illustrated by the block diagram provided in FIG. 25.

Figure 25:
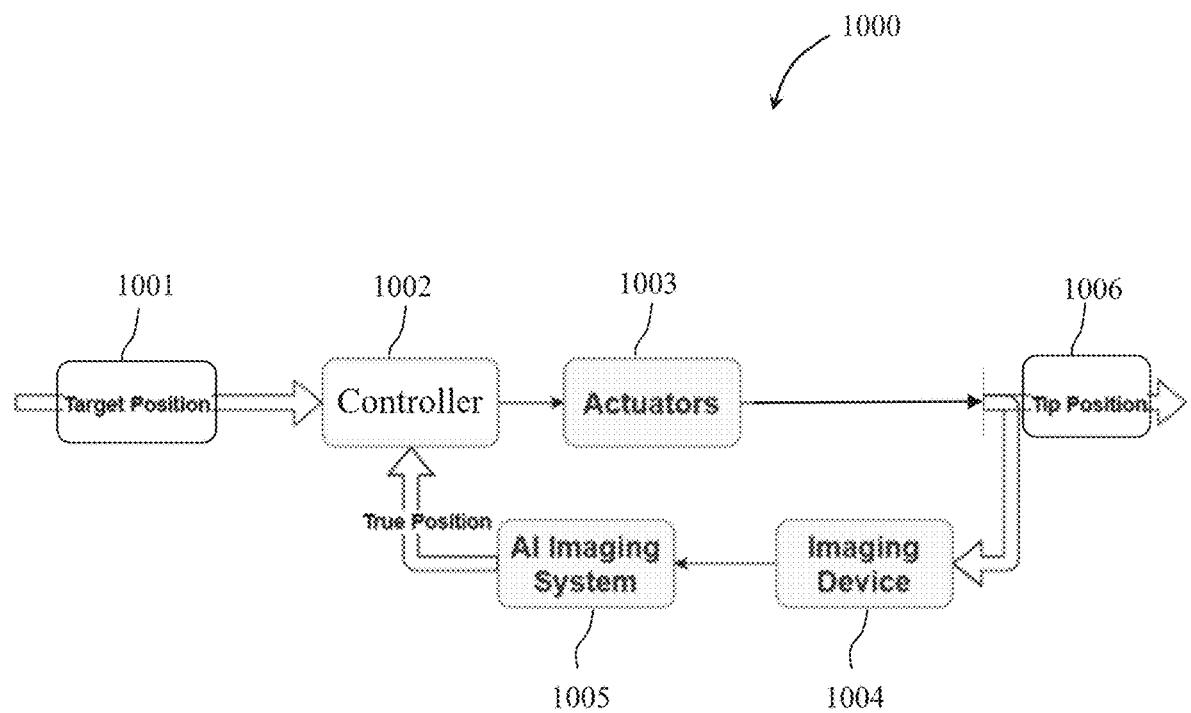
FIG. 25 schematically shows a block diagram of a method of controlling advancement of a tool through the platform towards the eye.

Attention is drawn to FIG. 25 illustrating a possible method 1000 of operating the toggles by a controller in a closed loop control system. Block 1001 illustrates an initial step of the method where a 'target position' is set for a tool introduced through a platform such as 10, 100 (or 1000 disclosed herein below). Such 'target position' may be a staphyloma, an optic nerve or any posteriorly located adjacent structures. The possible subsequent steps described in method 1000 may be aimed at adjusting (possibly continuously adjusting) a 'tip position' 1006 of the tool until it reaches the 'target position'.

In a first possible step 1002 a controller that receives the 'target position' may be arranged in a subsequent step 1003 to activate actuators/toggles controlling tilting of the conduit and possibly advancement of a tool being introduced through the conduit towards the eye.

An imaging device for direct visualization of the posterior pole such as a microscope, or indirect imaging modalities such as ultrasound or oct may detect the exact position of the surgical tool tip by visualization of the trunsillumination produced by the instruments tip which may be equipped with lighting source enabling transillumination of the adjacent tissue or via indentation of the sclera with a flexible tip or detected by the indirect modalities listed above, in a subsequent step 1004, such detection may then be communicated, possibly via an AI system in step 1005—so that a true position of the tool is received at the controller. This loop may continue until the 'tip position' generally matches the 'target position'.

Figure 3:
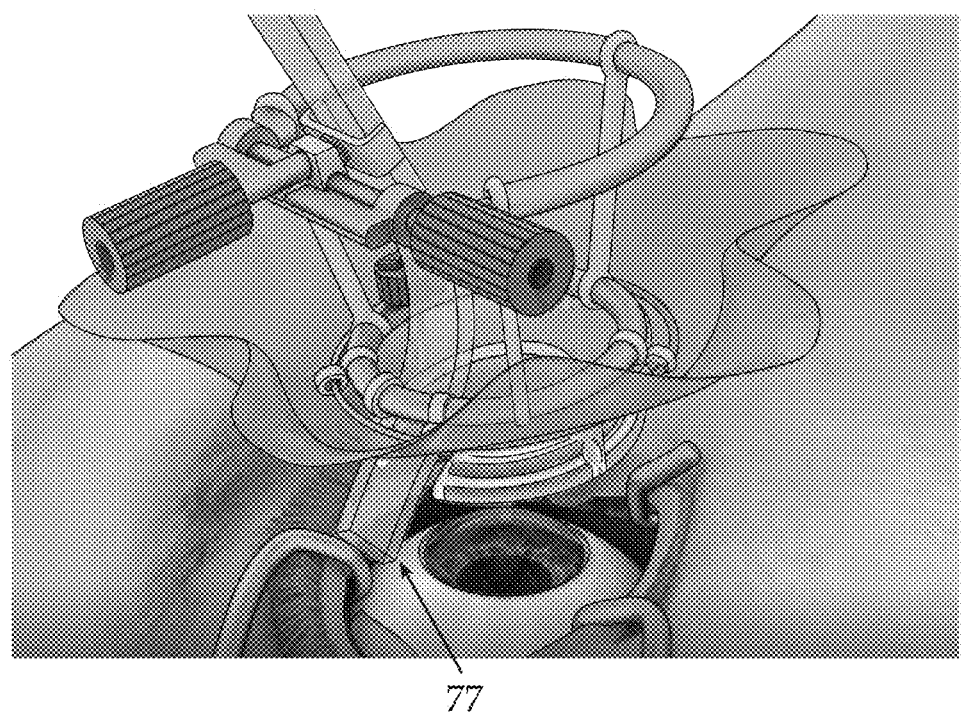
FIGS. 3 and 4 schematically show an embodiment of an eyeball platform being fitted to a human eyeball.

Attention is drawn to FIGS. 3 and 4 illustrating possible steps that may be taken in order to assume an anchored state of the platform 10 to an eyeball of a patient. As seen in FIG. 4, in the anchored state the platform may be engaged with the eyeball via the framework's terminal ring member 14. Substantial secure anchoring to the eyeball may be assisted by vacuum attachment means located at terminal ring member 14 and/or by any other suitable means such as pins that attach to the tissue of the eyeball (or the like).

Figure 5:
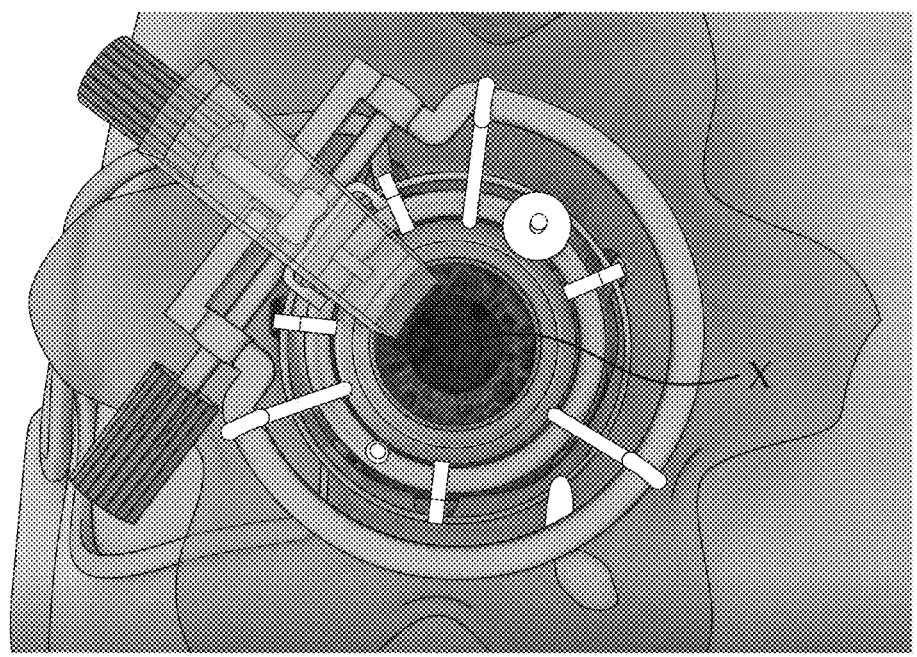
FIG. 5 schematically shows a top view generally along an optic axis of an eye of an embodiment of an eyeball platform securely fitted to a human eyeball.

In certain embodiments, once engaged with the eyeball, the anchoring sheath 18 possibly included in the platform may be suitably placed on surrounding facial regions, possibly adhered (e.g. self-adhered) to the skin of the patient by adhesive included upon sheath 18 and/or added to the sheath—to thus stabilize the platform in its anchored position with the aid of the skeletal orbital rim and/or facial bones. As indicated by the dashed arrow in FIG. 4, in the anchored state of the platform, a posterior tip section 77 of the conduit (see indicated in FIG. 3) may be arranged to pass through an incision 88 formed in the Tenon capsule to be situated below the Tenon capsule, which envelopes the eyeball. In this position, surgical tools introduced via the conduit towards the treatment zone may be guided to advance below the Tenon capsule in order to reach regions of the eyeball such as retrobulbar regions of the eye, where therapeutic or surgical treatment is required, Attention is drawn to FIG. 5 showing a top view generally along an optic axis of an eye of platform 10 in its anchored state. A surgeon attaching the platform to an eyeball of a patient, may be guided to generally align axis X of the platform to the optic axis of the eye, and therefore axis X may be taken to also represent the eye's optic axis.

As seen in FIG. 5, the generally coned formation of the platform together with the curvature of the conduit provide for a substantially un-obstructed line of the sight of the fundus of the eye to a surgeon treating the patient. The conduit accordingly assists in providing such a non-obstructed line of sight of the eye by initially slanting along its first section 201 in the posterior direction towards axis X and then slants along its second section 202 in an opposite direction away from axis X.

Figure 6:
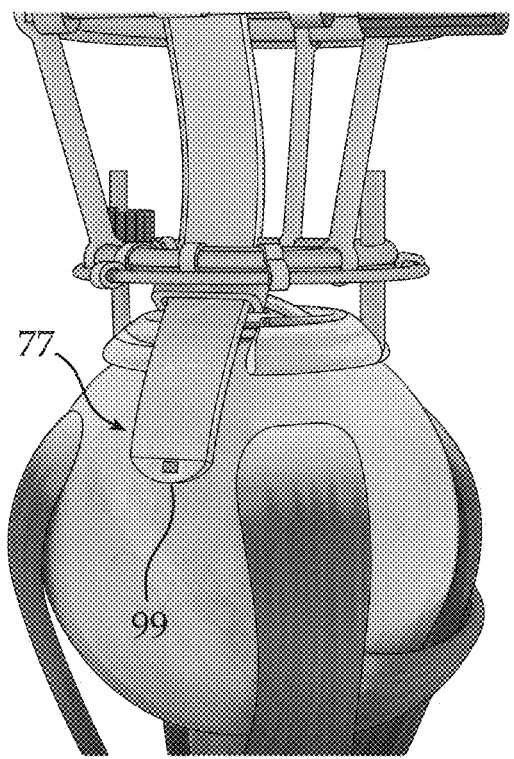
FIG. 6 schematically shows a human eyeball in isolation when securely fitted with an embodiment of an eyeball platform.
Figure 7:
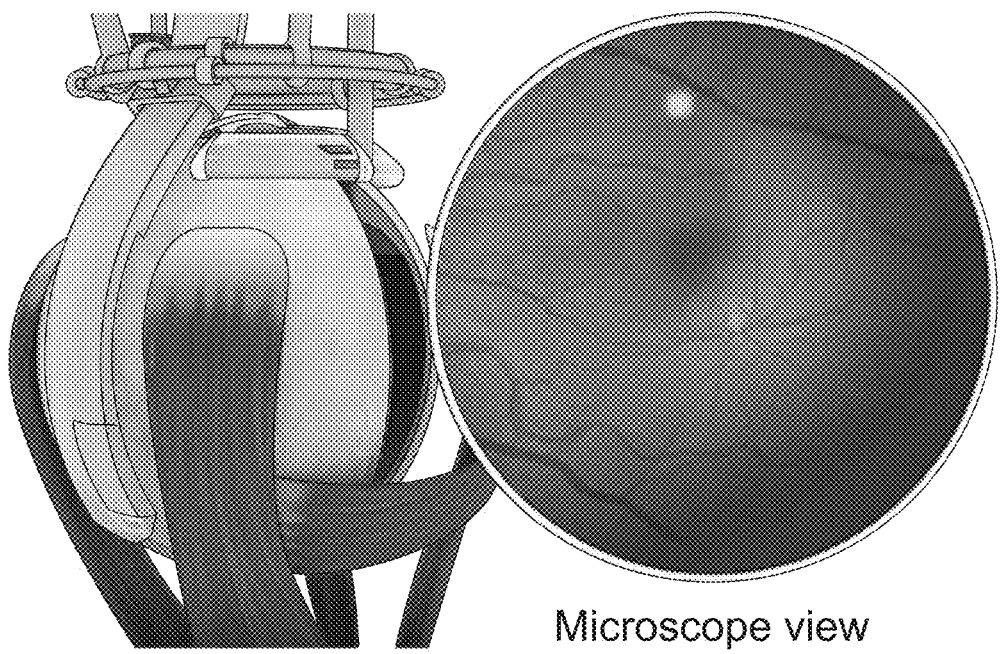
FIGS. 7 to 22 schematically show various embodiments of eyeball platforms during various surgical procedures.
Figure 8:
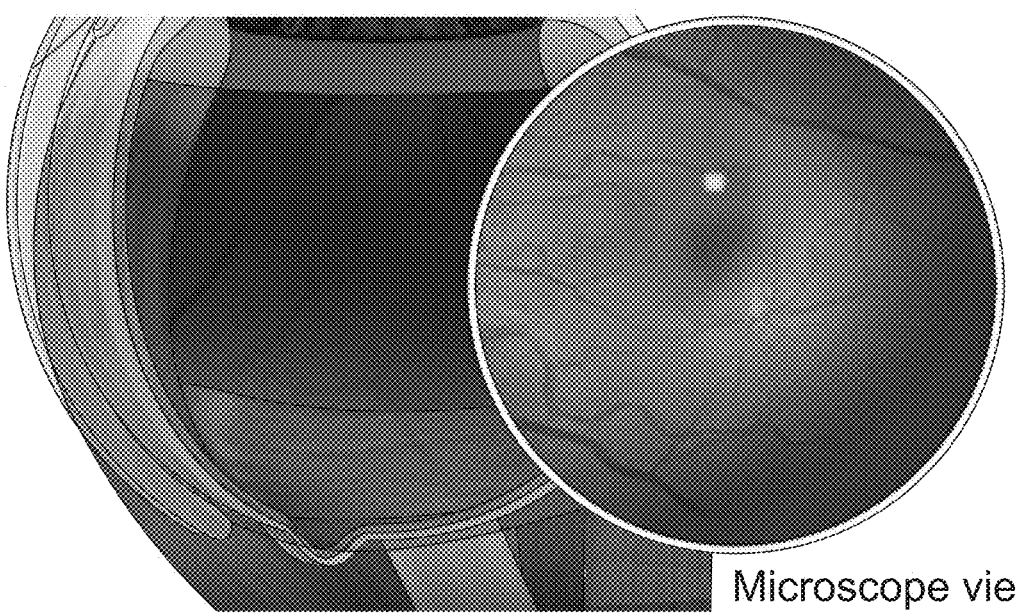
Figure 9:
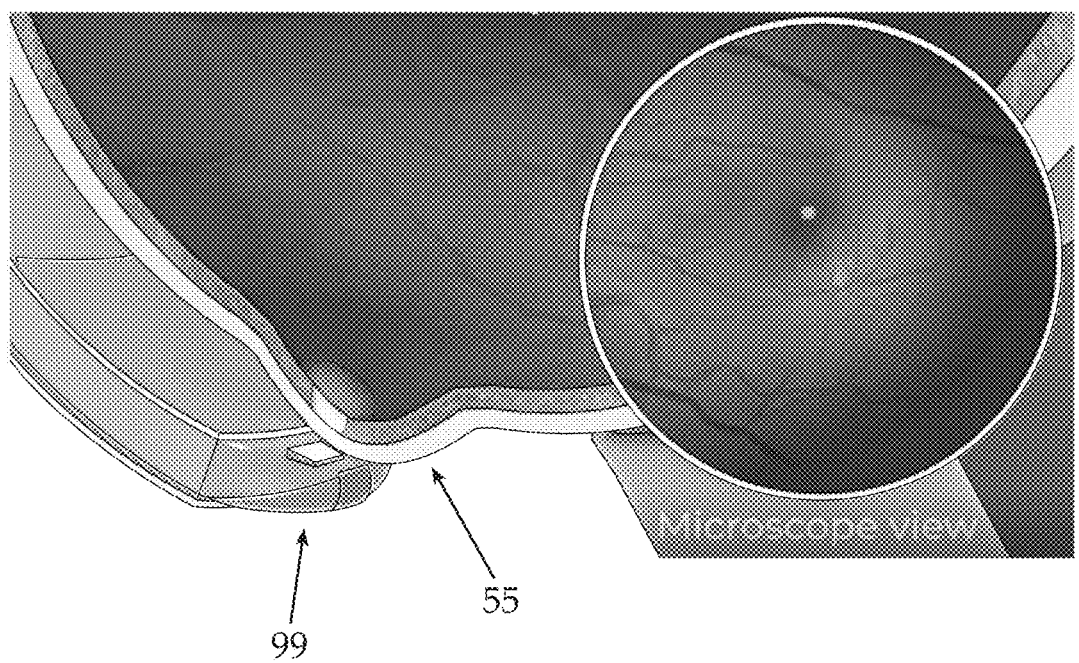
Figure 10:
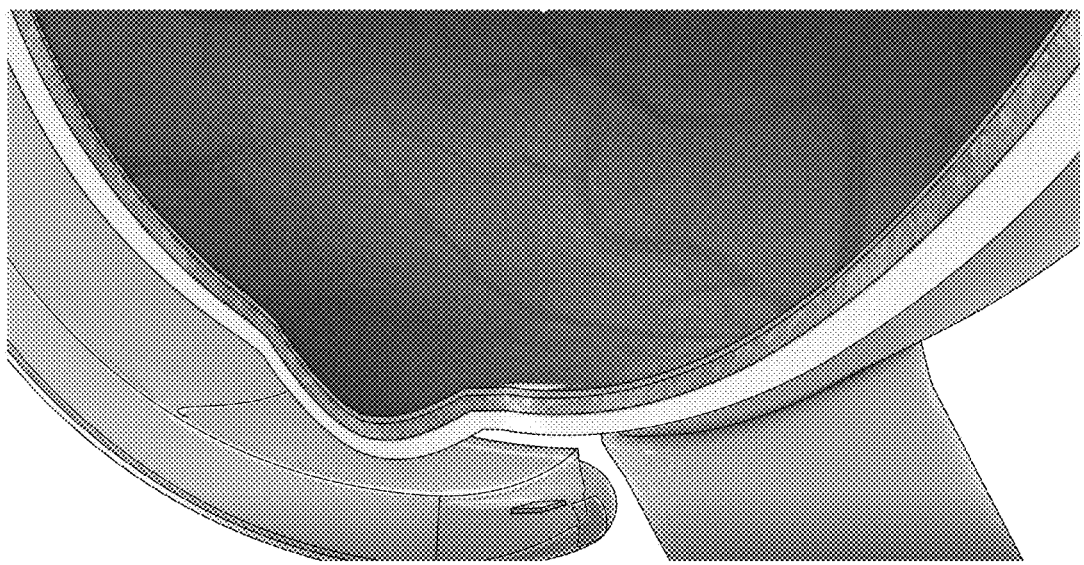
Figure 11:
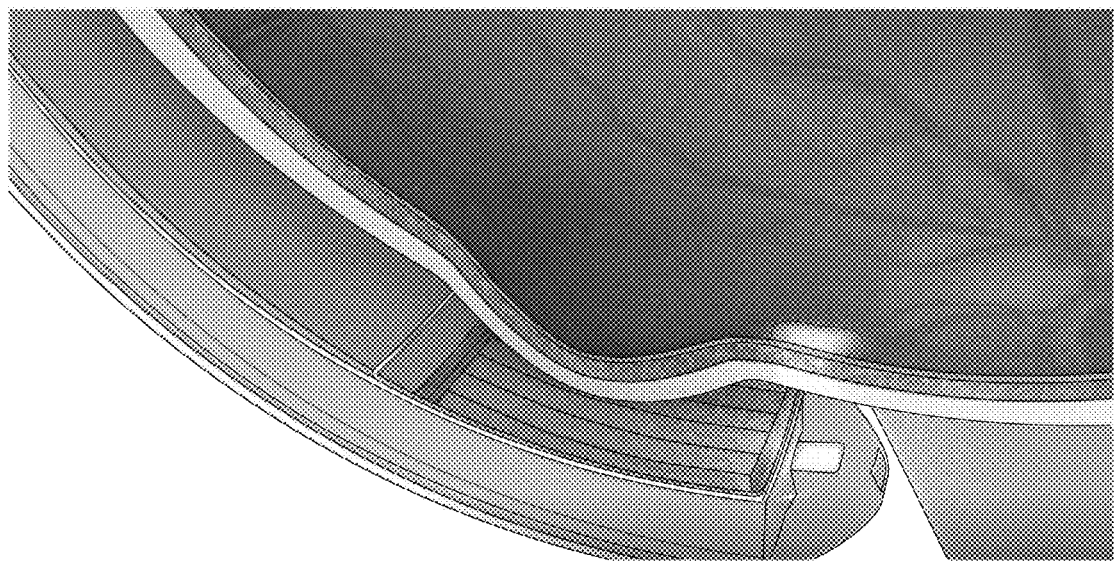
Figure 12:
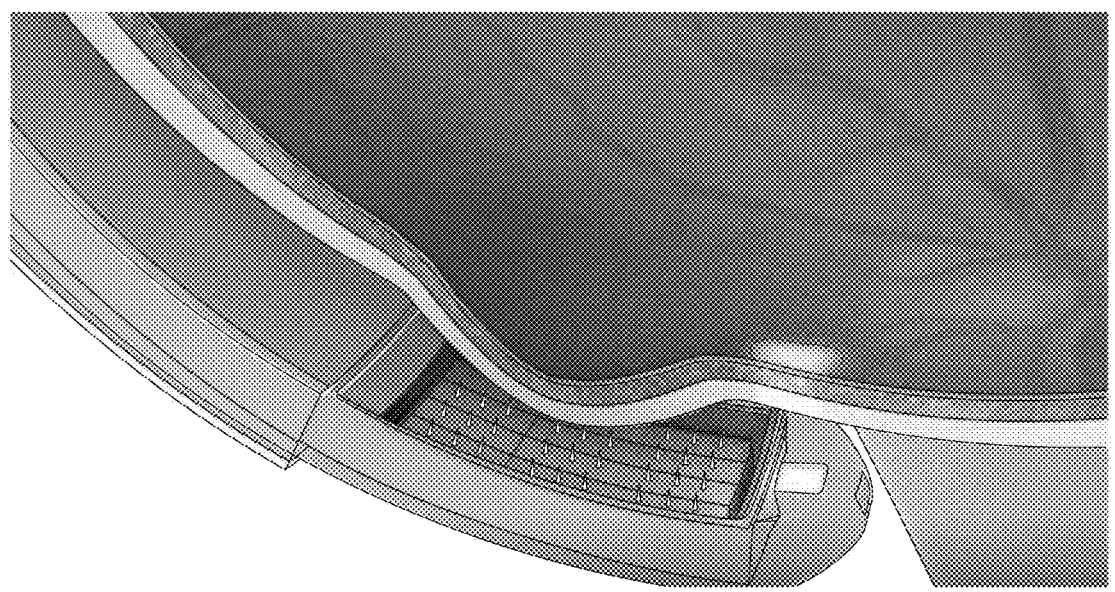
Figure 13:
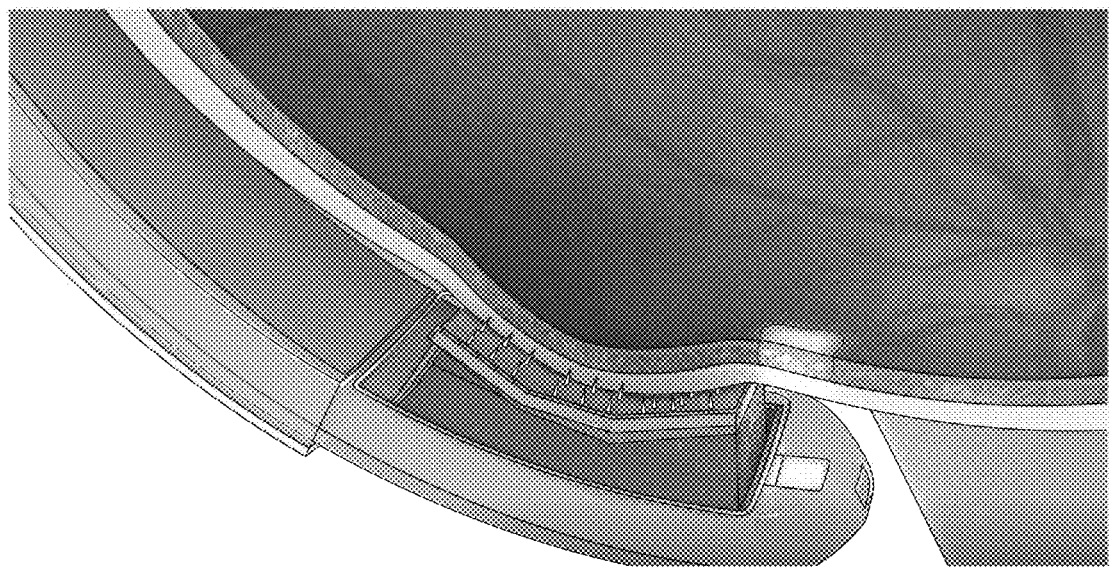
Figure 14:
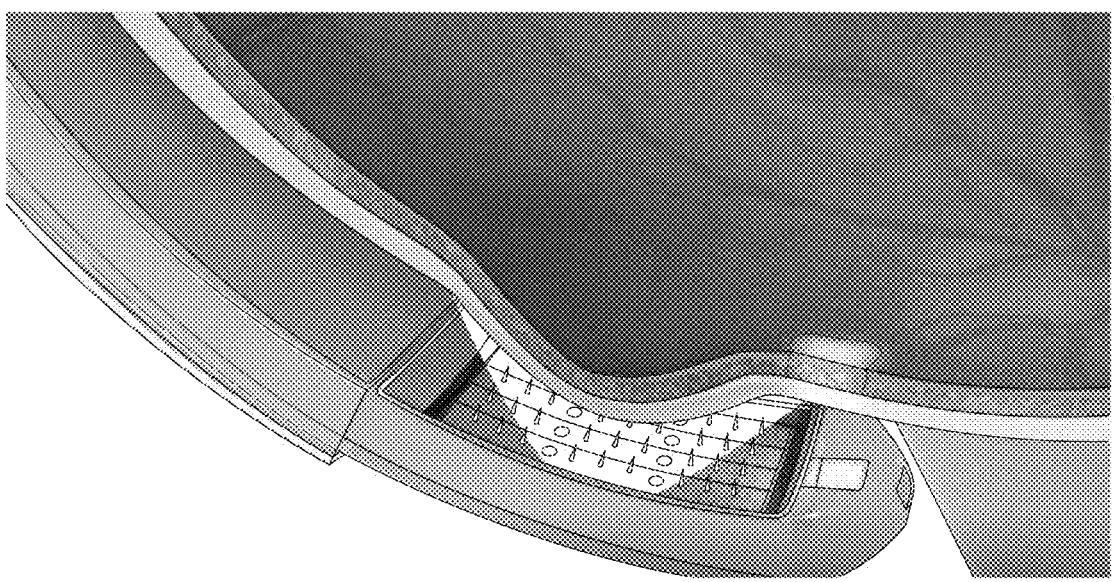

Attention is drawn to FIG. 6 illustrating the eyeball in isolation when securely fitted with the platform. Also seen in this view is a tip 99 of a surgical tool that advances out of the posterior tip section 77 of the conduit FIGS. 7 to 10 illustrate a possible route of advancement of tip 99 of a primary tool while possibly employing transillumination technique for tracking the tip possibly via a microscope observing the fundus of the eye through the platform generally along axis X. In this example, the route of advancement may be towards a staphyloma (see indicated as 55 in FIG. 9) or any other treatment zone.

As seen in FIGS. 11 to 14, once the primary tool's tip arrives at a vicinity of the staphyloma, various procedures may take place. An additional secondary tool that may be advanced via the primary tool, may be used for various treatments, such as scleral crosslinking by juxta and or/intra-scleral injection of a drug or chemical (see, e.g. FIG. 13). Scleral crosslinking can be achieved either by utilizing UV light (see, e.g. FIG. 14) or directly by the Chemical/drug. Such intra-scleral injection may possibly be achieved by a secondary tool that includes inflatable microneedles at its tip (or the like).

Figure 15:
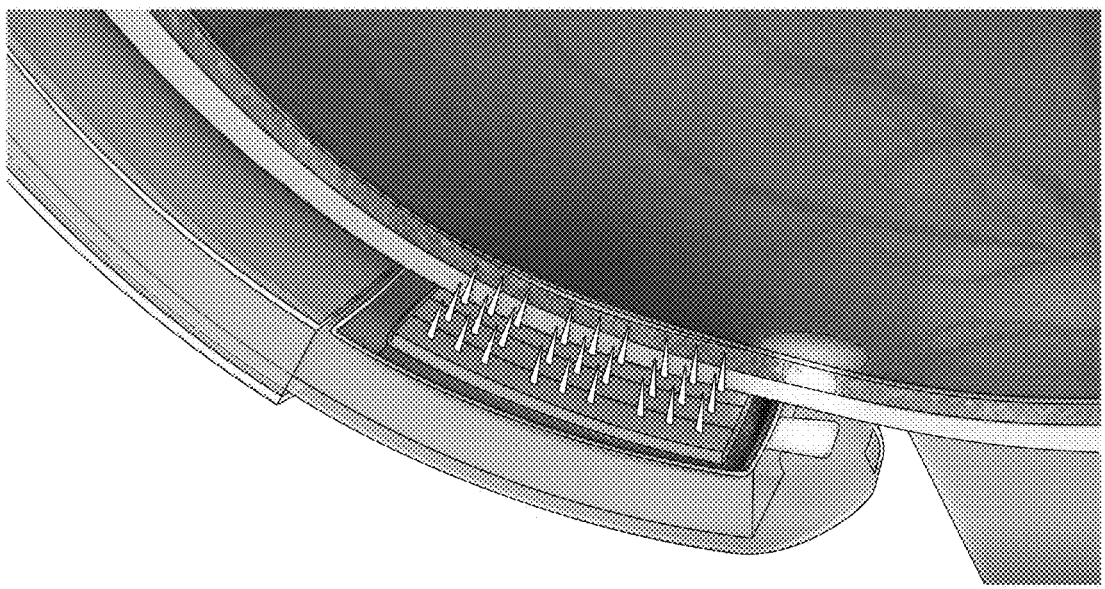
Figure 16:
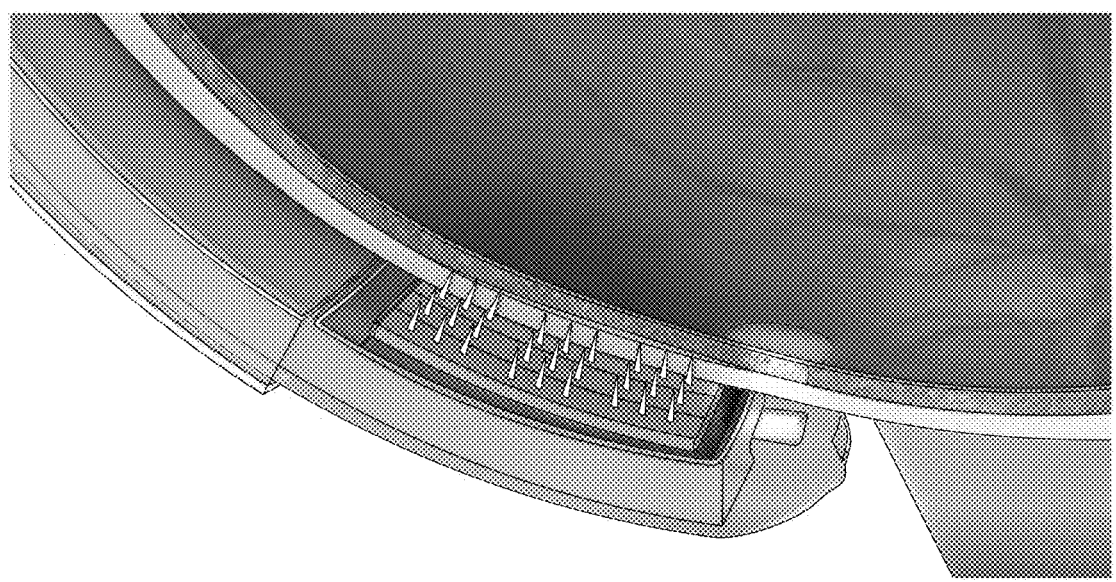

FIG. 15 illustrates an example of utilizing platform 10 for advancing a tool suitable for providing sub-retinal injection, and FIG. 16 illustrates an example of advancing via the conduit tool suitable for providing suprachoroidal injection.

Figure 17:
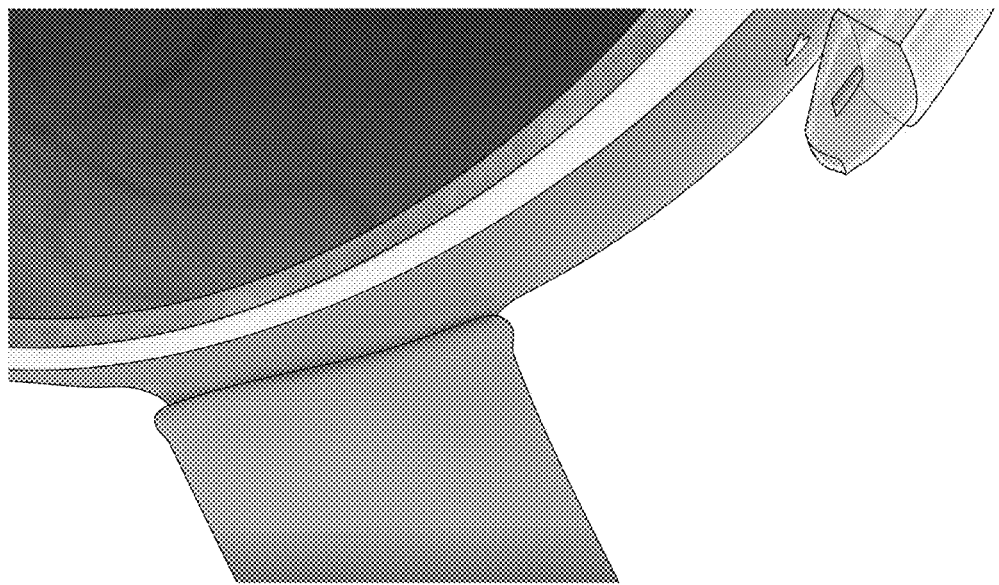
Figure 18:
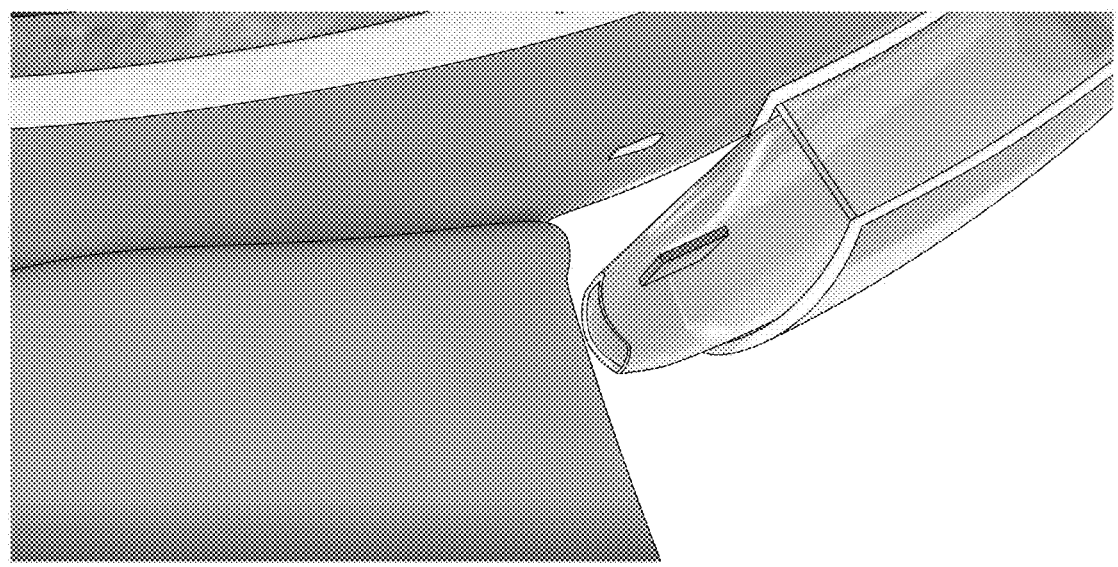
Figure 19:
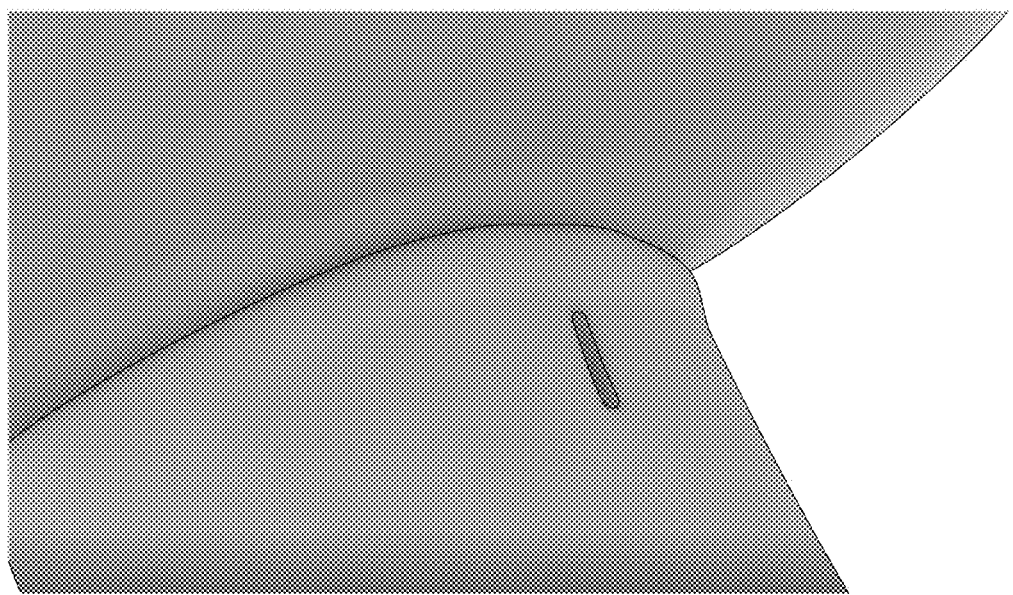

FIGS. 17 to 19 demonstrate advancement of a fenestration instrument towards the optic nerve possibly again using transillumination technique for tracking the tip of the instrument, in order to possibly perform optic nerve sheath fenestration (see, e.g., FIGS. 18, 19).

Figure 20:
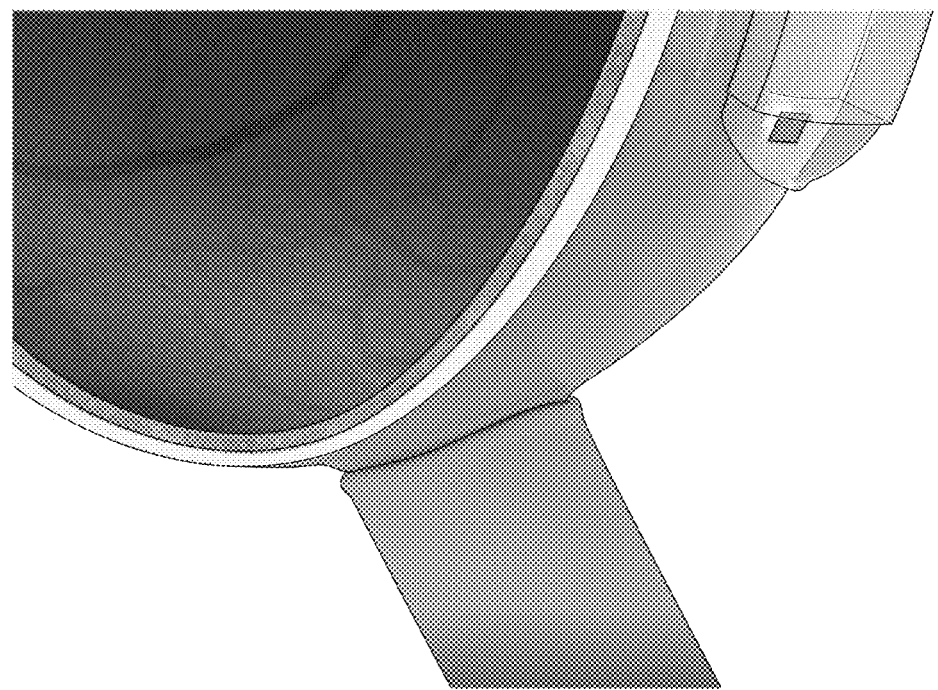
Figure 21:
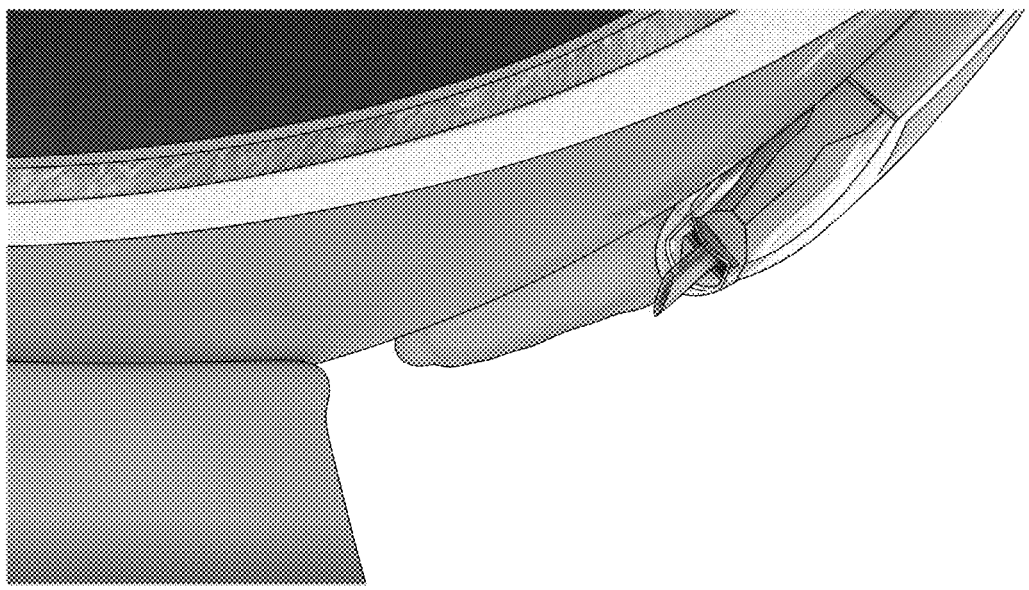
Figure 22:
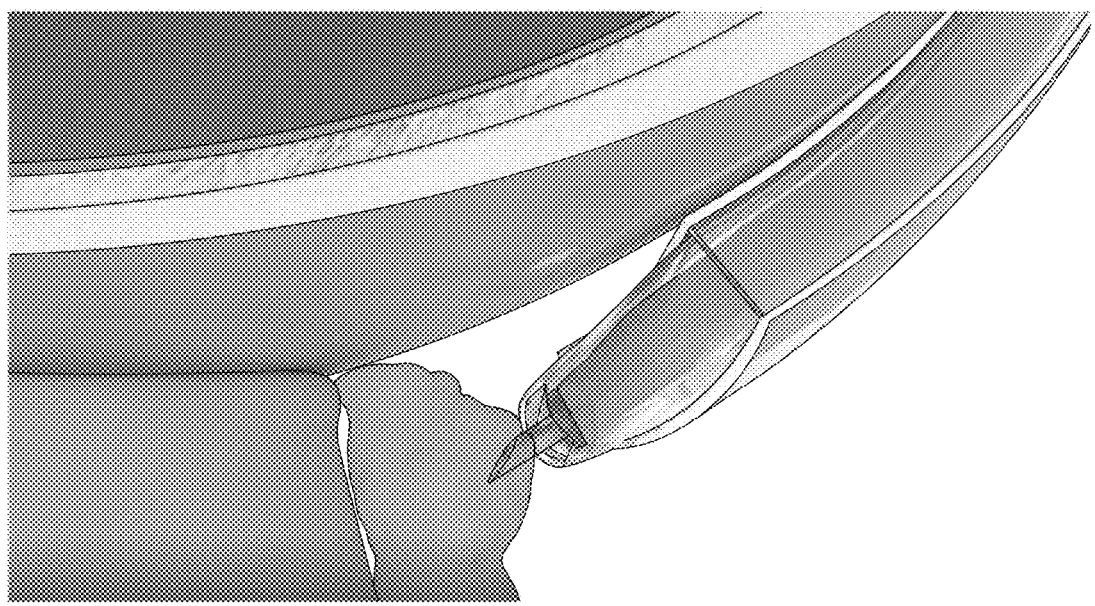
Figure 23A:
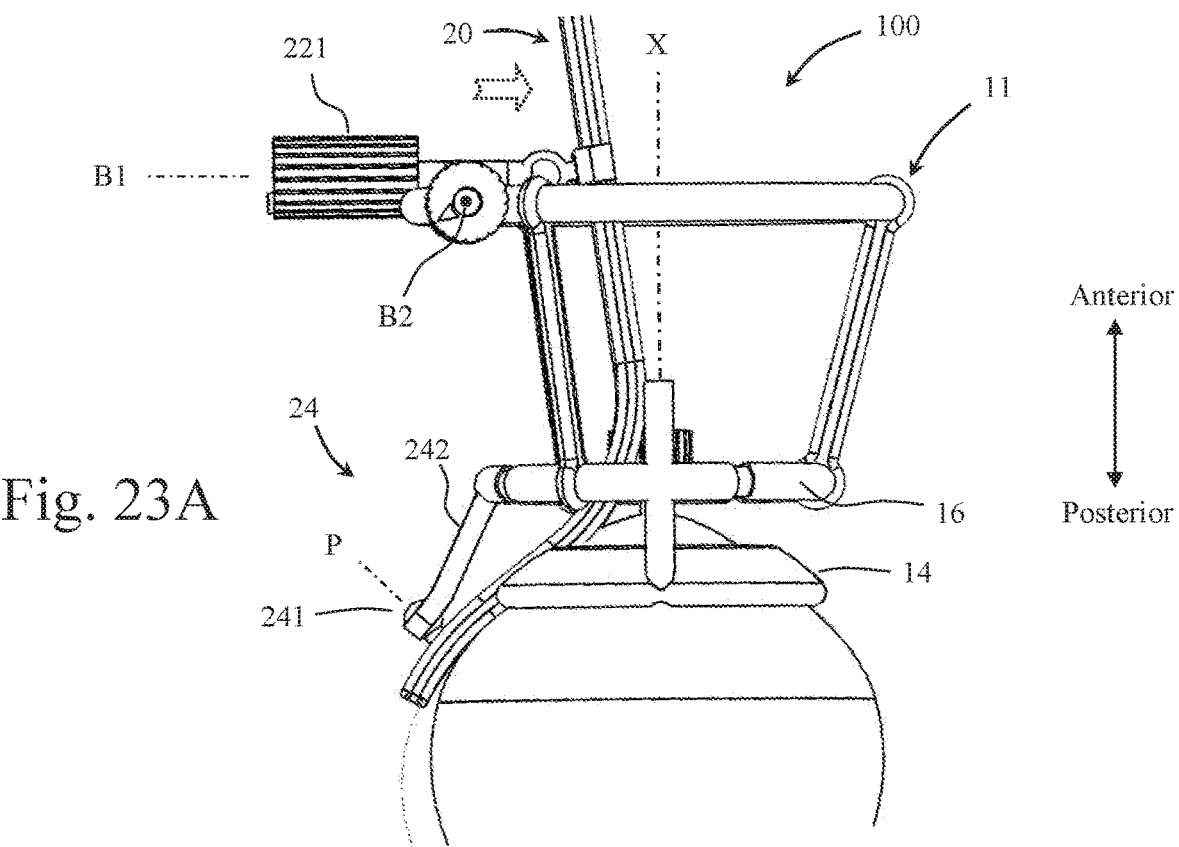
FIGS. 23A, 23B, 24A and 24B schematically show an eyeball platform in accordance with an embodiment of the present invention.
Figure 23B:
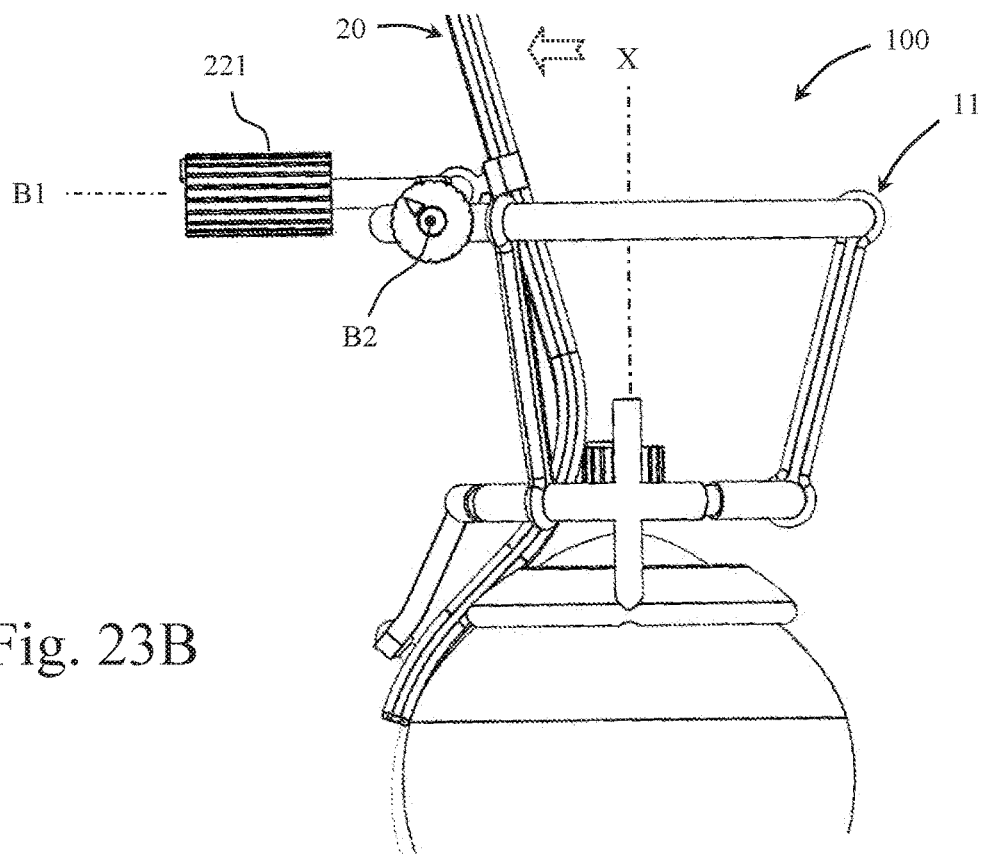
Figure 24A:
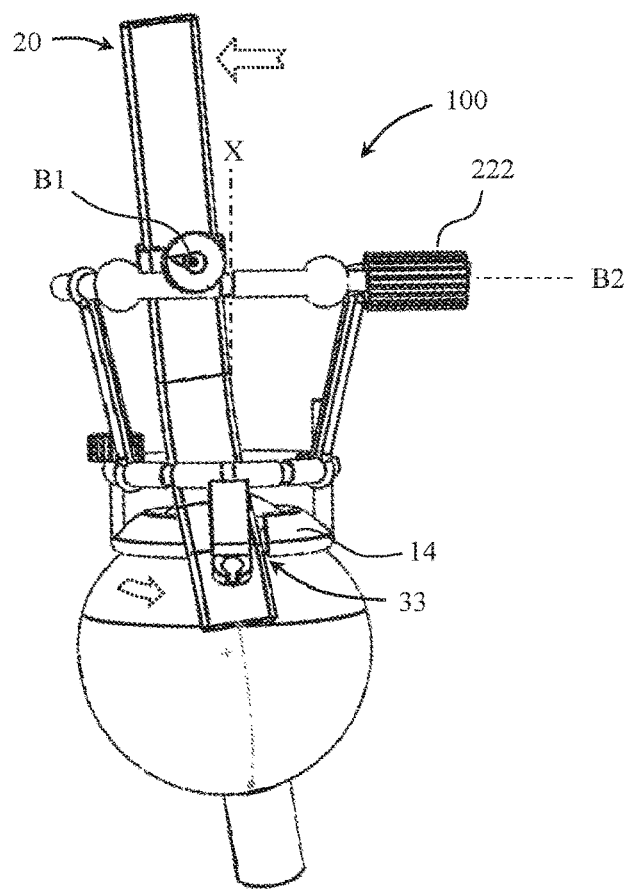
Figure 24B:
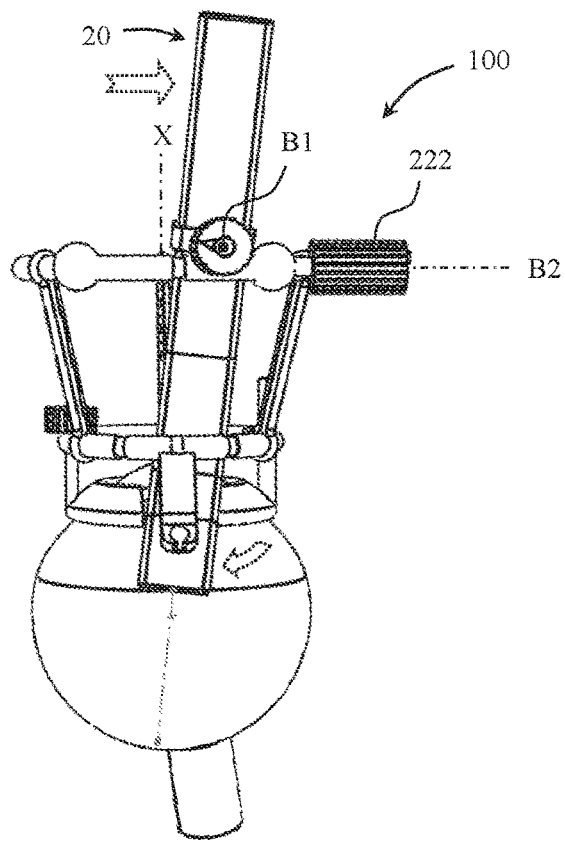

FIGS. 20 to 22 illustrate possibly advancement of drug delivery instruments via the platform, e.g. in order to perform drug injection adjacent the sclera for posterior scleritis (see FIG. 21), or for performing drug injection adjacent to the optic nerve for Neuritis/Neuropathy (see FIG. 21), or the like.

Figure 26:
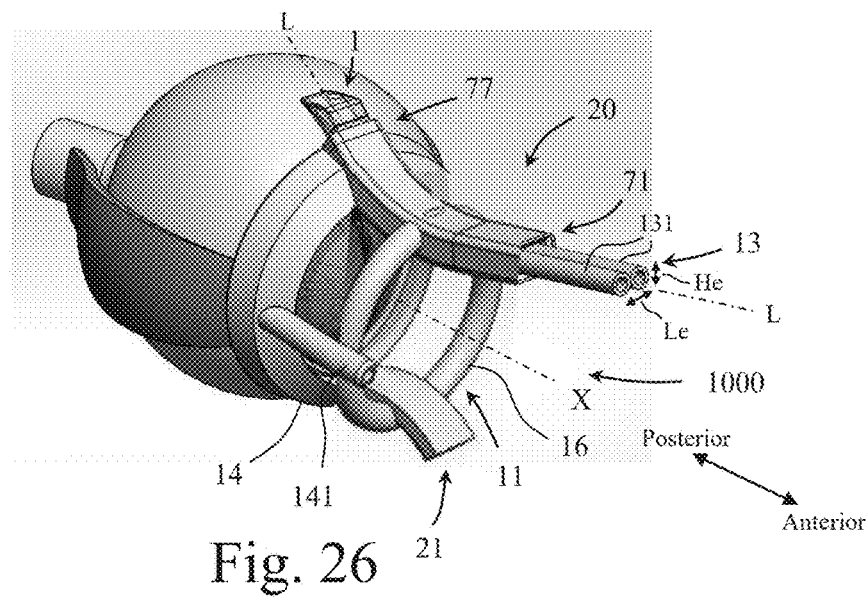
FIGS. 26 to 30 schematically show an eyeball platform in accordance with yet another embodiment of the present invention, and embodiments of a surgical tool to be used with the various eyeball platform embodiments disclosed herein.
Figure 27:
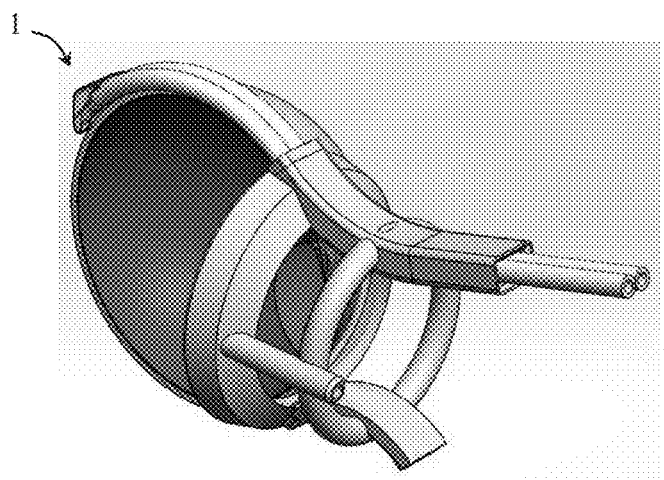

Attention is drawn to FIGS. 26 and 27 that schematically show an eyeball platform 1000 in accordance with an embodiment of the present invention. Platform 1000 has a framework 11 generally formed about a central axis X that defines opposing anterior and posterior axial directions. Platform 1000 as seen in addition includes an introducing channel or conduit 20 (from hereon referred to as "conduit"), that extends between an anterior section 71 and a posterior tip section 77.

Similar to the embodiment seen in FIG. 2, conduit 20 can be seen extending along a generally S curve that may be designed to have varying curvatures in a non-deformed state. Conduit 20 may include a first section (see 201 in FIG. 2) that may be generally straight, which transitions in a posterior direction into a second section (see 202 in FIG. 2) that may be designed to have an increased curvature that extends away from axis X. A rate of change of the curvature of the second section may initially increase as it extends away from the first section in the posterior direction and may then gradually decrease before possibly curving in an opposing direction.

Platform 1000 may be defined as being of a 'static' type, in that it may be substantially devoid of any dedicated adjustment mechanism (such as e.g. 22 seen in FIG. 2) for biasing and/or adjusting the orientation of the conduit 20 in relation to the framework 11. Platform 1000 can also be seen being provided with a support 21 that may be displaced from conduit upon the framework by about 180 degrees about axis X.

A physician anchoring platform 1000 to a patient during surgery may grasp the platform with his fingers (e.g. the thumb and middle finger, or the like), by placing them on the opposing structures of the conduit and support, in order to maneuver the platform towards its desired position on the eyeball.

An anchored state of the platform may be assisted by vacuum attachment means located at a terminal ring member 14 of the platform and/or by any other suitable means such as pins that attach to the tissue of the eyeball (or the like). A suction nozzle 141 in communication with the ring member may be used for creating the vacuum required for attachment to the eye (in the case that vacuum is used for assisting in attachment to the eye).

A possible anchoring sheath 18 (as seen e.g. in FIGS. 1-5) may be located about an intermediate ring member 16 of platform 1000, while being attached to the intermediate ring member. Intermediate ring member 16 as seen in this example is axially spaced apart from ring member 14 in the anterior direction.

In certain embodiments, once engaged with the eyeball, the anchoring sheath 18 possibly included in the platform may be suitably placed on surrounding facial regions, possibly adhered (e.g. self-adhered) to the skin of the patient by adhesive included upon sheath 18 and/or added to the sheath—to thus stabilize the platform in its anchored position with the aid of the skeletal orbital rim and/or facial bones.

In the anchored state of the platform, the posterior tip section 77 of the conduit may be arranged to pass through an incision formed in the Tenon capsule to be situated below the Tenon capsule, which envelopes the eyeball. In this position, surgical tools introduced via the conduit towards a targeted treatment zone may be guided to advance below the Tenon capsule in order to reach regions of the eyeball such as retrobulbar regions of the eye, where therapeutic or surgical treatment is required. Platform 1000 can be seen in these figures being used for guiding a surgical tool 13 towards such a targeted treatment zone.

It is noted that surgical tool embodiments being guided through any one of the eyeball platform embodiments described herein, may be suitably designed (e.g. provided with pre-defined curvatures along their extensions) to assist in their advancement towards retrobulbar regions of the eye, while maintaining their tips in proximity (possibly close abutment proximity) to the eye (e.g. proximity to the sclera of the eye).

The interaction of the surgical tools with the Tenon capsule may assist in obtaining such proximity to the eye. In certain cases, certain surgical tool embodiments may be equipped with guiding mechanisms for guiding the tip of the surgical tool in order to assist in obtaining such proximity to the eye, e.g. also when the tip is in retrobulbar regions of the eye. In certain cases, the proximity to the eye of guided or non-guided surgical tools may be of at least a tip region of the tool.

Reverting back to FIG. 26 it can be seen that surgical tool 13 may be formed having a longitudinal extension L, which in cross sections perpendicular to axis L may have a lateral extension (Le) and a height extension (He). The lateral extension (Le) (similar to the surgical tool embodiments already described and shown hereinbefore)—may possibly be sized to be larger than the height extension (He), for example about one and a half or twice larger (i.e. Le≥~1.5 or ~2×He). Such sizing of Le to relative He may be aimed at increasing the tool's moment of inertia so that the surgical tool may have improved resistance to twisting about its longitudinal extension L during use.

In this example, the surgical tool 13 can be seen being advanced towards the eye with one of its sides that extends along the lateral direction being oriented to bear against the interior of the eyeball (e.g. the sclera) while being advanced below the Tenon capsule towards a targeted treatment zone. Having the larger sized lateral extension Le in contact with the eyeball may further assist in stabilizing and controlling a desired orientation of the surgical tool 13 as it reaches its targeted treatment zone, possibly at retrobulbar regions of the eye.

In the shown example, the surgical tool 13 can be seen being formed from two tubes 131 that extend one aside the other along axis L—however other embodiments may be equally possible, such as surgical tools having generally rectangular, elliptical or other formations in their cross sections.

Conduit 20 can be seen in this example (and also in former embodiments) as having an interior passage for the surgical tool that generally corresponds in cross section to the cross section of the surgical tool—in order to suitably guide the surgical tool towards its targeted treatment zone.

Also seen in the figures is that the surgical tool 13 may include a terminal port 1 at its distal leading side that is designed to lead it towards its targeted treatment zone as the tool is advanced along the eye below the Tenon capsule. In FIG. 27 the surgical tool 13 can be seen with its terminal port 1 reaching a targeted treatment zone, in this example at a retrobulbar region of the eye.

Figure 28:
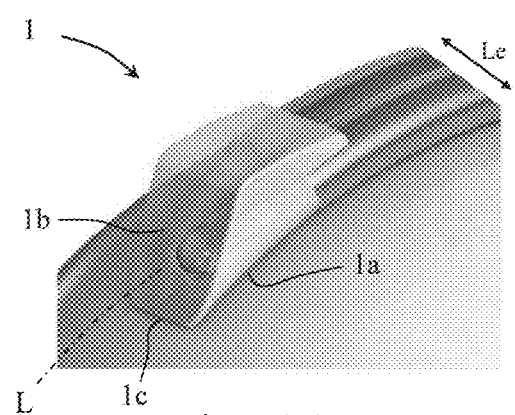

Attention is drawn to FIG. 28 for a closer view of the tool's terminal port 1 when in position upon a targeted zone of the eyeball (with the Tenon capsule not being shown in this view). The terminal port 1 in this example can be seen being formed upon the distal axial end of the tool, and can be seen having a flat lower side 1*a* that is adapted to contact the interior of the eyeball (e.g. sclera) and a chamfered leading side 1*b* at its axial end that tapers towards its lower side 1*a* to meet it at a merge 1*c*.

Surgical tool embodiments having such a chamfered leading side 1*b* may be suited to advance the surgical tool to its targeted treatment zone while assisting in maintaining the orientation of the terminal port 1 with its flat lower side 1*a* pressed against the eyeball—due to substantial constant engagement of the chamfered leading side 1*b* with the Tenon capsule it encounters as it advances towards its targeted position.

Figure 29:
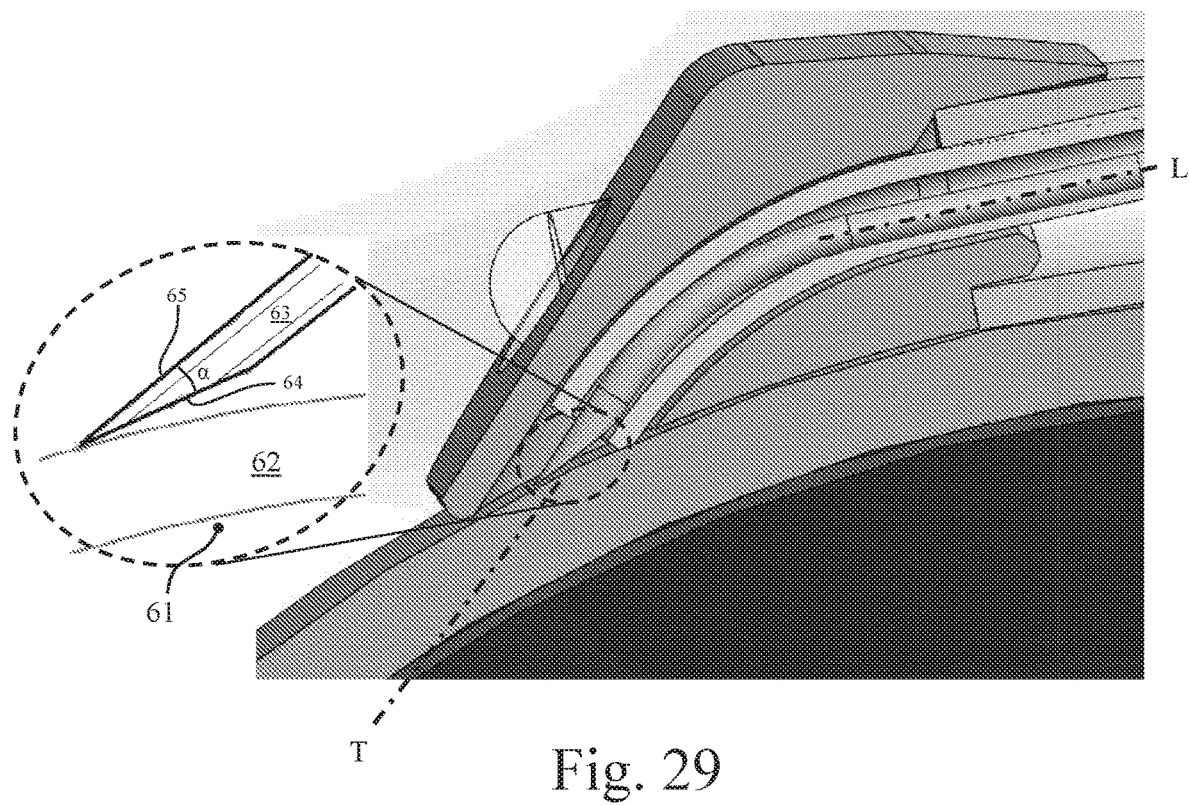
Figure 30:
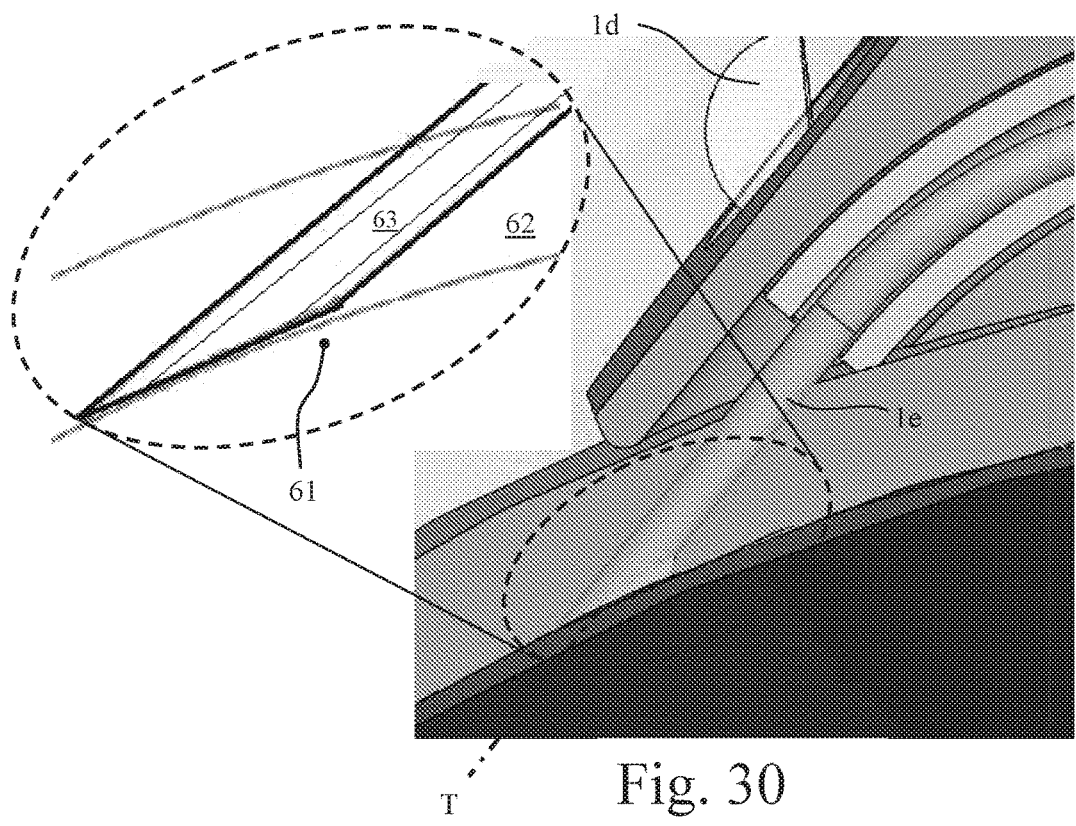

Attention is drawn to FIGS. 29 and 30 showing cross sectional views of the surgical tool's terminal port 1 taken along a plane generally parallel to axis L of the surgical tool. The terminal port 1 as seen in this example may include an optical member 1*d*. Optical member id may be suited to provide illumination and/or imaging of regions adjacent the terminal port of the surgical tool. In one non-binding example, the optical member 1*d* may be an LED however other options may also be possible such as a fiber optic assisted illumination and/or imaging (or the like). An optical member such as id may be used for assisting in the tracking of the surgical tools tip via a microscope, as seen in the examples shown e.g. in FIGS. 7 to 10.

Surgical tool 13 can also be seen in the example as including a movable hollow needle member 1*e* that can be seen in FIGS. 29 and 30 being advanced to penetrate through a layer 62 of the eye in order to reach a targeted zone 61 that is beneath layer 62. In a non-binding example, layer 62 may be the sclera layer of the eye and targeted zone 61 may be the Suprachoroidal or subretinal spaces of the eye.

The needle member can be seen being curved by a passage that leads it towards its distal exit point from the surgical tool, so that it is urged to extend along an axis T that is inclined relative to the surgical tool's axis L in this distal section of the tool. The needle member's tip can also be seen in this example having a relative small angle α that is formed between a chamfer or bevel 64 and an outer periphery 65 of the needle member. Such small angle α in some examples may be generally smaller than about 45 degrees and preferably smaller than about 25 or 15 degrees. A hollow passage 63 of the needle member opens out via the chamfer 63 at its tip.

As seen in the enlarged section at the left hand side of FIG. 29, the distal tip of the needle member as it advances towards its targeted zone 61 in this example of the Suprachoroidal or subretinal spaces—initially exposes its sharped edged tip towards the outer side of the sclera 62 in a position/orientation suitable to penetrate into the sclera.

As seen in the enlarged section at the left hand side of FIG. 30, as the needle member advances along axis T within the sclera 62 towards the targeted zone 61, the chamfer of the tip reaches targeted zone 61 at a position where it is generally tangent to zone 61. In this position the needle member is suited to release drugs, devices, radioactive components, stem cells or gene carriers (or the like)—towards the targeted zone 61 with reduced likelihood of injecting unintentionally substances into other adjacent regions of the eye, such as the choroid, retina or into the vitrous cavity—since its sharp edge is now less positioned in an ideal orientation to penetrate into such adjacent regions other than the targeted zone.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A platform for assisting in advancing surgical tools for treating an eye of a patient,
the platform having a central axis defining opposing anterior and posterior directions, and comprising:
a ring like attachment member suitable for attachment to an eyeball of the eye, wherein the attachment member is formed about the central axis at a posterior side of the platform,
the platform further comprising a hollow conduit having an interior passage through which surgical tools can be advanced generally in the posterior direction, wherein the conduit comprises a first section along which its interior passage slants generally in the posterior direction towards the central axis, and a second generally curved section along which its interior passage extends, at least along a substantial initial portion thereof, away from the first section and away from the central axis generally in the posterior direction.

2. The platform of claim 1, wherein the second section is arranged to protrude in a generally posterior direction away from the attachment member.

3. The platform of claim 2, wherein the interior passage in the second section has a rate of change of curvature as the interior passage in the second section extends away from the first section the generally posterior direction that gradually decreases until curving in an opposing direction.

4. The platform of claim 3, wherein the conduit comprises a tip at a posterior end of the conduit that is arranged to be situated below the Tenon capsule in the subtenon space of the eyeball when the platform is fitted to the eyeball.

5. The platform of claim 3, further comprising a suction nozzle in communication with the attachment member for creating vacuum required for the attachment to the eyeball.

6. The platform of claim 1, further comprising an adjustment mechanism for adjusting orientation of the conduit relative to a framework of the platform.

7. The platform of claim 6, wherein adjusting the orientation is along two axes.

8. The platform of claim 7, wherein the conduit is configured to be tilted.

9. A system for treating a retrobulbar region of an eye comprising:
a platform having a central axis defining opposing anterior and posterior directions, and comprising:
a ring-like attachment member suitable for attachment to an eyeball of the eye, wherein the attachment member is formed about the central axis at a posterior side of the platform,
the platform further comprising a hollow conduit having an interior passage through which surgical tools can be advanced generally in the posterior direction, wherein the conduit comprises a first section along which its interior passage slants generally in the posterior direction towards the central axis, and a second generally curved section along which its interior passage extends, at least along a substantial initial portion thereof, away from the first section and away from the central axis generally in the posterior direction, and
a surgical tool that is movable through the conduit of the platform.

10. The system of claim 9, further comprising a primary tool that is movable through the conduit, wherein the surgical tool is a secondary tool that extends through the primary tool.

11. The system of claim 10, further comprising a tracking device for tracking a tip of the primary tool.

12. The system of claim 11, wherein the system has the ability to tilt the conduit relative to a framework of the platform in order to control advancement of the primary tool.

13. The system of claim 12, wherein the surgical tool comprises a movable hollow needle member that is curved by a passage that leads the movable hollow needle member towards a distal exit point from of the primary tool such that the movable hollow needle member extends from the exit point along an axis that is inclined relative to an axis of the surgical tool.

14. A method for treating a retrobulbar region of an eye comprising the steps of:
providing a system comprising a platform having a central axis defining opposing anterior and posterior directions, and comprising:
a ring-like attachment member suitable for attachment to an eyeball of the eye, wherein the attachment member is formed about the central axis at a posterior side of the platform,
the platform further comprising a hollow conduit having an interior passage through which surgical tools can be advanced generally in the posterior direction, wherein the conduit comprises a first section along which its interior passage slants generally in the posterior direction towards the central axis, and a second generally curved section along which its interior passage extends, at least along a substantial initial portion thereof, away from the first section and away from the central axis generally in the posterior direction, and advancing a surgical tool through the conduit of the platform.

15. The method of claim 14, further comprising providing a primary tool that is movable through the conduit, wherein the surgical tool is a secondary tool that extends through the primary tool.

16. The method of claim 15, further comprising providing a tracking device for tracking a tip of the primary tool.

17. The method of claim 16, wherein the system has the ability to tilt the conduit relative to a framework of the platform in order to control advancement of the primary tool.

18. The method of claim 17, wherein the surgical tool comprises a movable hollow needle member that is curved by a passage that leads the movable hollow needle member towards a distal exit point of the primary tool such that the movable hollow needle member extends from the exit point along an axis that is inclined relative to an axis of the surgical tool.

19. The method of claim 15, wherein, in a cross-section perpendicular to a longitudinal extension of the primary tool, the primary tool has a lateral extension that is larger than a height extension of the primary tool.

20. The method of claim 19, wherein, in the cross-section of the primary tool, the primary tool has a generally rectangular shape.

* * * * *